United States Patent [19]

Adams et al.

[11] Patent Number: 4,926,959

[45] Date of Patent: May 22, 1990

[54] OPERATOR CONTROL FOR VEHICLE COMPONENTS

[75] Inventors: Frederic R. Adams, Troy; Jeffrey M. Boyer, Rochester; Ronald N. Schultz, Troy; Barry Taylor, Bloomfield Hills, all of Mich.

[73] Assignee: Saturn Corporation, Troy, Mich.

[21] Appl. No.: 396,261

[22] Filed: Aug. 21, 1989

Related U.S. Application Data

[63] Continuation of Ser. No. 261,541, Oct. 24, 1988, abandoned.

[51] Int. Cl.[5] .............................................. B60R 25/00

[52] U.S. Cl. ...................................... 180/315; 70/237; 180/287

[58] Field of Search ........................... 180/315; 70/237

[56] References Cited

U.S. PATENT DOCUMENTS

| | | | |
|---|---|---|---|
| 4,419,712 | 12/1983 | Shimizu et al. | 180/287 |
| 4,672,375 | 9/1987 | Mochida et al. | 180/287 |
| 4,673,914 | 6/1987 | Lee | 180/287 |
| 4,719,460 | 1/1988 | Takeuchi et al. | 180/287 |

*Primary Examiner*—Richard A. Bertsch

*Attorney, Agent, or Firm*—Herbert Furman

[57] ABSTRACT

An operator control for vehicle components includes drive and driven members respectively operating a power actuator and a mechanical drive for moving a vehicle component between its operative positions. The drive and driven members move as a unit between operative positions of the driven member corresponding to the operative positions of the component. The drive member is uncoupled from the driven member at the operative positions of the latter for independent movement to its operative positions which also correspond to the operative positions of the component. The drive and driven members respectively operate the power actuator and the mechanical drive at their respective operative positions.

10 Claims, 2 Drawing Sheets

OPERATOR CONTROL FOR VEHICLE COMPONENTS

This is a continuation of application Ser. No. 261,541 filed on Oct. 24, 1988, now abandoned.

This invention relates generally to operator controls for vehicle components and more particularly to an operator control for sequentially operating mechanical means and power operating means to move a vehicle component control between operative positions.

It is common in vehicles to provide each door of a vehicle with a manually operable member, such as a knob or slide, which is mechanically connected through a rod, lever, or cable to the locking-unlocking control of the door latch, such as the locking lever, to move such control between its locked and unlocked operative positions and thereby place the door latch in its corresponding locked or unlocked operative position or condition. It is also known to provide each door of the vehicle with a power operator, such as a linear or rotary solenoid, or motor, which is connected to the locking-unlocking control to power move the control between its locked and unlocked operative positions. A manually operable member, such as a switch, is provided on each door, other than the driver's door, to actuate the power operator of such door. The switch provided on the driver's door actuates all of the power operators when manually operated.

This operator control of this invention integrates the manually operable member for the mechanical means and the power operating means into a single operator control for sequentially operating the mechanical means and the power operating means to move the vehicle component control between its operative positions and thereby place the vehicle component in its corresponding operative positions. While the operator control is particularly intended for use with vehicle door latches, it can also be used with other vehicle component controls and vehicle components having a plurality of operative positions.

In the preferred embodiment, the operator control includes drive and driven members slidably mounted on a support for movement as a unit between first and second operative positions of the driven member corresponding to like positions of the vehicle component control and vehicle component. The drive and driven members are coupled to each other during such movement. When the drive and driven members are in either operative position of the driven member, the drive member is uncoupled for further independent movement to its operative position corresponding to the same position of the driven member and vehicle component control. The driven member is mechanically coupled to the locking-unlocking control of the vehicle component to mechanically move such control between its operative positions. The drive member controls the power operator to move the vehicle control between its operative positions. Since the mechanical means first moves the vehicle component control between its operative positions, the power operating means normally will have no effect on the vehicle component control. However, if either the mechanical means or the power operating means is ineffective, the other is always available to move the vehicle component control to the desired operative position. Further, since the operator control on the drivers door controls the power operating means of all doors, it is effective to actuate the power operators of the doors other than the drivers door when the drive member moves between its operative positions.

The primary feature of this invention is that it provides an operator control for operating mechanical operating means and power operating means for moving a vehicle component control between its operative positions. Another feature is that the operator control sequentially operates the mechanical operating means and the power operating means. A further feature is that the operator control includes drive and driven members which move between their respective operative positions corresponding to the same operative positions of the vehicle component control. Yet another feature is that the driven member controls the mechanical operating means and the drive member controls the power operating means, with the drive and driven members moving as a unit between the operative positions of the driven member corresponding to the same operative positions of the vehicle component control, and the drive member moving independently of the driven member at the operative positions of the latter to corresponding positions of the drive member.

These and other features of the invention will be readily apparent from the following specification and drawings wherein.

Figure 4:
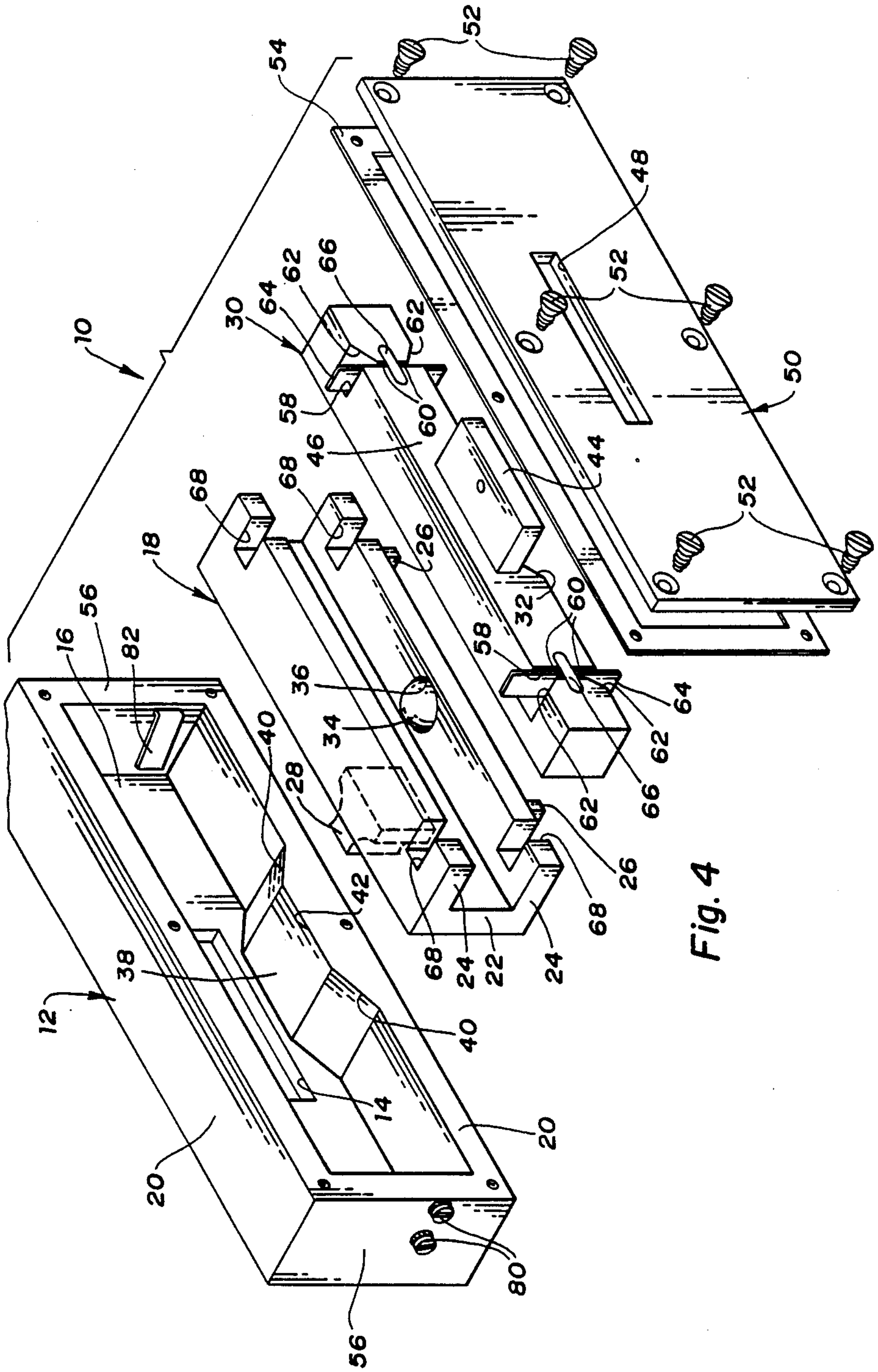
FIG. 4 is an exploded perspective view.

Referring now to the drawings, the operator control 10 includes a rectangularly shaped support or housing 12 having an elongated slot 14 in its upper wall 16. An elongated U-shaped drive member 18, FIG. 4, is slidably mounted between the side walls 20 of housing 12. The base or upper wall 22 of the drive member 18 engages the inner side of wall 16 of the housing, one leg or side wall 24 of the drive member engages one side wall 20 of the housing, and the other side wall 24 of the drive member includes transverse ribs 26 slidably engaging the other side wall 20 of the housing 18. A manually graspable knob 28 extends outwardly through slot 14 from the upper wall 22 of the drive member 18, FIG. 1.

A driven member 30 is slidably mounted between the side walls 24 of the drive member 18. The driven member includes an outwardly opening generally triangularly shaped slot 32, FIGS. 2 and 3, in one side wall thereof A ball 34 is slidably received within a circular opening 36 in one of the side walls 24 of the drive member 18 and also within the slot 32. The side wall 20 of the housing 12 facing the opening 36 is provided with a ramp structure 38 which includes angular walls 40 connected by a planar wall 42.

An integral apertured tab 44 projects downwardly from the lower wall 46 of the driven member 30 and outwardly through a slot 48 in a cover 50 which closes the lower open wall of the housing 12 and is secured thereto by a number of screws 52. A gasket 54 is provided between the cover 50 and the lower edges of the side walls 20 and end walls 56 of the housing 12.

The driven member 30 includes like slots adjacent each end thereof, with each slot having a planar side wall 58 facing a shorter planar wall 60 connected to angular walls 62. A planar spring member 64 seats against each wall 58 and is secured thereto by a plug 66 which is inserted into a slot traversing the walls 58 and 60 and also into a partial transverse slot of the spring member 64. Each spring member 64 traverses the driven member 30 and has its ends engaging side walls of slots 68 of the side walls 24 of the drive member 18. The spring members 64 resiliently couple the drive and driven members 18 and 30.

Figure 1:
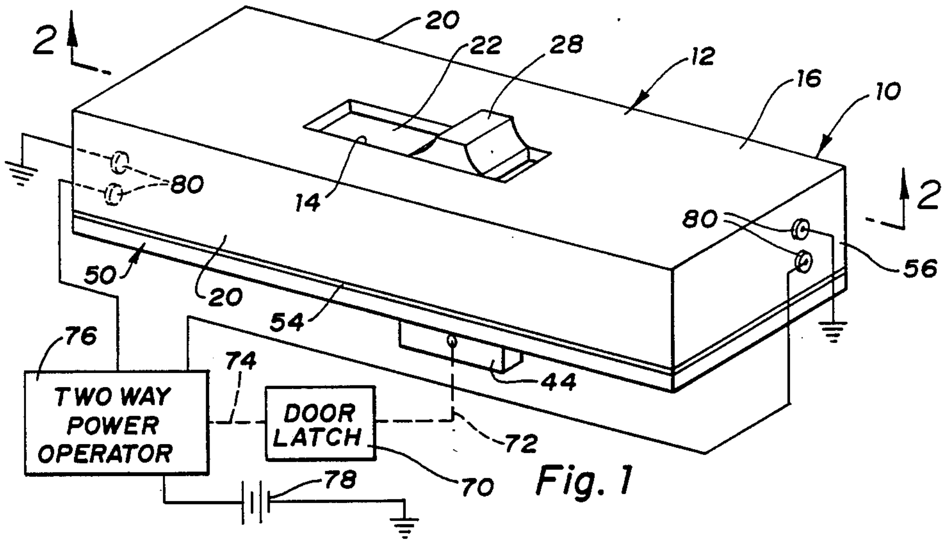
FIG. 1 is a perspective view of an operator control according to this invention.

FIG. 1 shows the operator control 10 mechanically coupled to the locking lever of a vehicle door latch 70 of the front left hand driver's door of a vehicle by a rod 72 connected between tab 44 of the driven member 30 and the locking lever of latch 70. The locking lever of latch 70 is also connected in a known manner at 74 to an electrically actuated power operator 76, such as a solenoid.

The locking lever of the door latch 70 is conventionally coupled to an overcenter spring to alternately locate this lever in locked and unlocked positions by engagement of the lever with stops on the latch frame under the action of the overcenter spring. The action of such overcenter spring through the rod 74 is sufficient to hold the ends of the driven member in engagement with respective end walls 56 of the housing 12. Door latches having such a locking lever arrangement are in current production use today on vehicles manufactured by the assignee of this invention. Reference may also be had to U.S. Pats. No. 4,598,532 Konchan and 4,603,877 Espinoza et al for a showing of such a locking lever arrangement.

Power operator 76 is connected to ground across the vehicle battery 78 and one of the switches in each end wall of housing 12. As shown in FIG. 4, each such switch includes a pair of contacts 80 mounted to an end wall 56 and a switch blade 82 mounted to one contact 80 and engageable with the other contact 80 to close the switch.

Figure 2:
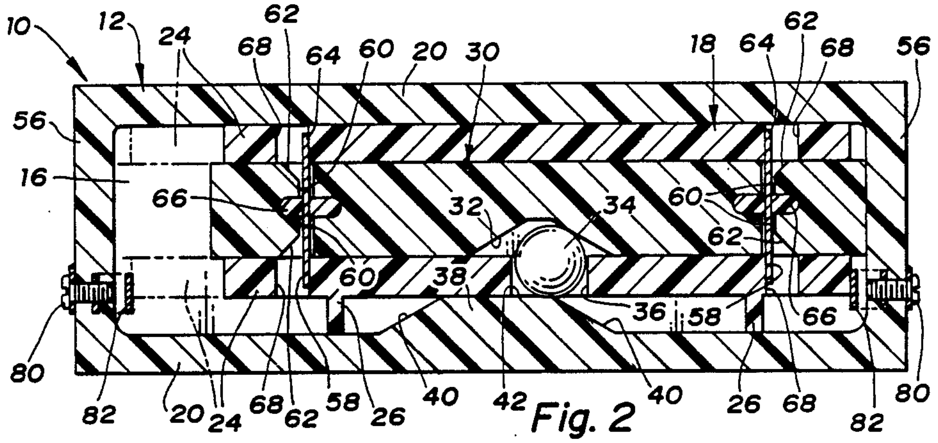
FIG. 2 is a sectional view taken on line 2—2 of FIG. 1 showing the drive and driven members of the control in full lines in one of the operative positions of the driven member and in dash lines in the other operative position.
Figure 3:
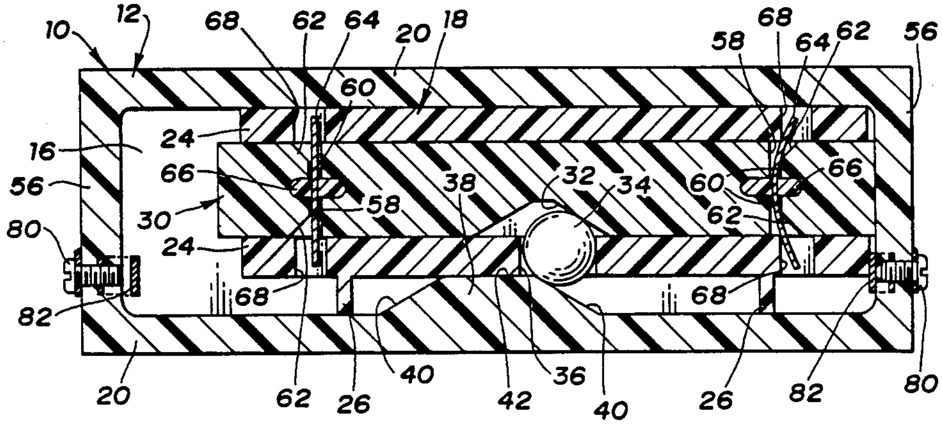
FIG. 3 is a view showing the drive member in one operative position corresponding to the one operative position of the driven member.

With reference now to FIGS. 1 through 3, assume that the locking lever of door latch 70 is in its unlocked operative position and it is desired to move such control to its locked operative position. With reference to the full lines of FIG. 2, when the locking lever is in unlocked position, the right hand end of the driven member 30 engages the right hand end wall 56 of housing 12 to locate the driven member in its unlocked operative position corresponding to the same unlocked operative position of the locking lever of the door latch. The ball 34 engages the right hand angular wall of the slot 32 and right hand angular wall 40 of ramp 38. The engagement of the right hand spring member 64 with the left hand walls of the right hand slots 68 of the drive member resiliently resists movement of the drive member independently of the driven member to the right to its unlocked operative position corresponding to the same operative position or condition of the door latch control, as will be explained.

In order to move the locking lever of door latch 70 to its locked operative position, the driver of the vehicle grasps the knob 28 and moves the knob to the left within slot 14. The engagement of ball 34 with the right hand angular wall of slot 32 and the planar wall 42 of ramp 38 couples the drive member to the driven member for movement as a unit to the left until the left hand end of the driven member 30 engages the left hand wall 56 of housing 12 as shown in dash lines in FIG. 2. During this movement of the drive and driven members, the tab 44 moves to the left within slot 48 and mechanically moves the locking lever of the door latch to its locked operative position through the rod 72.

It will be understood that each of the doors of the vehicle will have an operator control as shown in the drawings. Further, the operator control on the drivers door will be electrically connected to the power actuators 76 of the other vehicle doors in a conventional manner.

Assume now that the the drive member 18 and the driven member 30 are in their FIG. 2 full line positions and the driver desires to power move all of the door latches 70 of the vehicle doors to unlocked position. The driver will grasp the knob 28 and move this knob to the right within slot 14 as viewed in FIG. 1. With reference to FIGS. 2 and 3, as the drive member 18 moves to the right, the ball 34 will move with the drive member and roll down the right hand angular wall 40 of ramp 38 and along the right hand angular wall of slot 32 to permit the drive member to move independently of the driven member 30 to the right from its FIG. 2 position to its FIG. 3 unlocked operative position corresponding to the same unlocked operative positions of the driven member and the locking lever of latch 70. The engagement of the right hand spring member 64 with the left hand walls of slots 68 will resiliently resist movement of the drive member to the right and will return the drive member from its FIG. 3 unlocked position to its FIG. 2 position as soon as the driver releases the knob 28.

When the drive member 18 moves to the right, it will engage the switch blade 82 of the right hand switch and close the switch blade across the right hand contacts 80 to complete the circuit and actuate the power operator 76. The power operator 76 will be ineffective to move the locking lever of the driver's door latch 70 to unlocked position since this lever will already have been mechanically moved to the unlocked position. However, this movement of the drive member will close the circuits across the power operators of the other vehicle doors to move the locking levers of such door latches to unlatched position if they are not already in this position through actuation of their own controls 10.

If the drive member 18 and the driven member 30 are in their dash line positions of FIG. 2, the locking lever of door latch 70 of the drivers door will be in locked position. Movement of the knob 28 to the left within slot 14 will close the left hand switch by closing the left hand switch blade 82 across the left hand switch contacts 80 in the manner previously described to again actuate the power operator 76 to move the locking levers of the door latches of the other doors of the vehicle to their locked position if they are not already in this position through action of their own controls 10.

Although movement of the knob 28 has been described in a two step manner, it will be understood that the knob can be moved continuously from its FIG. 1 full line and dash line positions to positions engaging the right hand and left hand ends of slot 14.

Thus this invention provides an operator control for sequentially operating mechanical means and power operating means for moving a vehicle component control between operative position.

The embodiments of the invention in which an exclusive property or privilege is claimed are defined as follows:

1. In combination with a plurality of vehicle components having controls movable between first and second operative positions, mechanical means for mechanically moving one of the component controls between its first and second operative positions, and power operating means for power moving all of the component controls between their first and second operative positions, an operator control for sequentially operating the mechanical means and the power operating means comprising, a support, a driven member mounted on the support for movement between first and second operative positions corresponding to the first and second operative positions of all of the component controls, means operable upon movement of the driven member between its first and second operative positions for mechanically moving the one component control between its corresponding first and second operative positions, a manually movable drive member mounted on the support for simultaneous movement with the driven member between the first and second positions of the driven member and continued movement independently of the driven member to the first and second operative positions of the drive member corresponding to the first and second operative positions of all of the component controls, means coupling the drive member to the driven member for simultaneous movement of the driven and drive members as a unit between the first and second positions of the driven member to mechanically move the one component control between its first and second operative positions, and means operable at each of the first and second positions of the driven member uncoupling the drive member from the driven member for additional movement of the drive member to the same position as the driven member to actuate the power operating means and power move all of the component controls to the same position as the one component control was moved by the driven member.

2. In combination with a plurality of vehicle components having controls movable between first and second operative positions, mechanical means for mechanically moving one of the component controls between its first and second operative positions, and power operating means for power moving all of the component controls between their first and second operative positions, an operator control for sequentially operating the mechanical means and the power operating means comprising, a support, a driven member mounted on the support for movement between first and second operative positions corresponding to the first and second operative positions of all of the component controls, means operable upon movement of the driven member between its first and second operative positions for mechanically moving the one component control between its corresponding first and second operative positions, a manually movable drive member mounted on the support, for simultaneous movement with the driven member between the first and second positions of the driven member and continued movement independently o the driven member to the first and second operative positions of the drive member corresponding to the first and second operative positions of all of the component controls, means coupling the drive member to the driven member for simultaneous movement of the driven and drive members as a unit between the first and second positions of the driven member to mechanically move the one component control between its first and second operative positions, means operable at each of the first and second positions of the driven member uncoupling the drive member from the driven member for additional manual movement of the drive member independently of the driven member to actuate the power operating means and power move all of the component controls to the same position as the one component control was moved by the driven, and resilient means resisting additional manual movement of the drive member independently of the driven member and returning the drive member to the first or second operative position of the driven member.

3. An operator control for sequentially operating mechanical means and power operating means for a vehicles component comprising, a support, a driven member mounted on the support for movement between first and second operative positions relative thereto, means operable upon movement of the drive member to the first or second operative position for operating the mechanical means for the vehicle component, a manually movable drive member mounted on the support for movement with the driven member to the first and second operative positions thereof and additional movement independently of the driven member to first and second operative positions to operate the power operating means for the vehicle component, means coupling the drive member to the driven member for unitary movement to the first and second operative positions of the driven member, means operable at each of the first and second operative positions of the driven member for uncoupling the coupling means and permitting the additional movement of the drive member to the first or second operative position of the drive member to operate the power operating means, and means returning the drive member to the first or second operative position of the driven member upon manual release of the drive member.

4. The combination recited in claim 3 including wherein the returning means includes resilient means coupling the drive member and the driven member and resisting movement of the drive member to the first or second operative position thereof.

5. The combination recited in claim 3 wherein the drive and driven members are mounted on the support for linear movement relative thereto, and the means operable by the drive member at the first or second operative position thereof includes switch means.

6. The combination recited in claim 3 wherein the support includes stop means engageable by the driven member to locate the driven member in the first and second operative positions thereof, and the means operable by the drive member at the first and second operative positions thereof includes switch means mounted on the support.

7. The combination recited in claim 3 wherein the support includes linear first wall means mounting the drive and driven members thereon for linear movement to the first and second operative positions thereof, and second wall means engageable by the driven member to locate the driven member in the first and second operative positions thereof.

8. The combination recited in claim 7 wherein the second wall means mounts switch means engageable by the drive member in the first and second operative positions thereof to actuate the power operating means.

9. The combination recited in claim 3 wherein the mechanical coupling means includes a ball seat provided in one of the drive and driven members, shoulder means on the support including a linear portion, and a ball freely rotatably mounted on the other of the drive and driven members and engageable with the ball seat and linear portion, the length of the linear portion being generally the same as the distance of movement of the drive member between its first and second operative positions.

10. The combination recited in claim 9 wherein the shoulder means includes ramp portions to each side of the linear portion, the ball being located adjacent one of the ramp portions in the first or second operative position of the driven member and moving along such one ramp portion and out of the ball seat to uncouple the drive member from the driven member and permit movement of the drive member to its first or second operative position.

* * * * *